March 4, 1930.  J. F. JOHNSON  1,749,586
OIL SEALING RING FOR TURBINE BEARINGS
Filed March 28, 1924
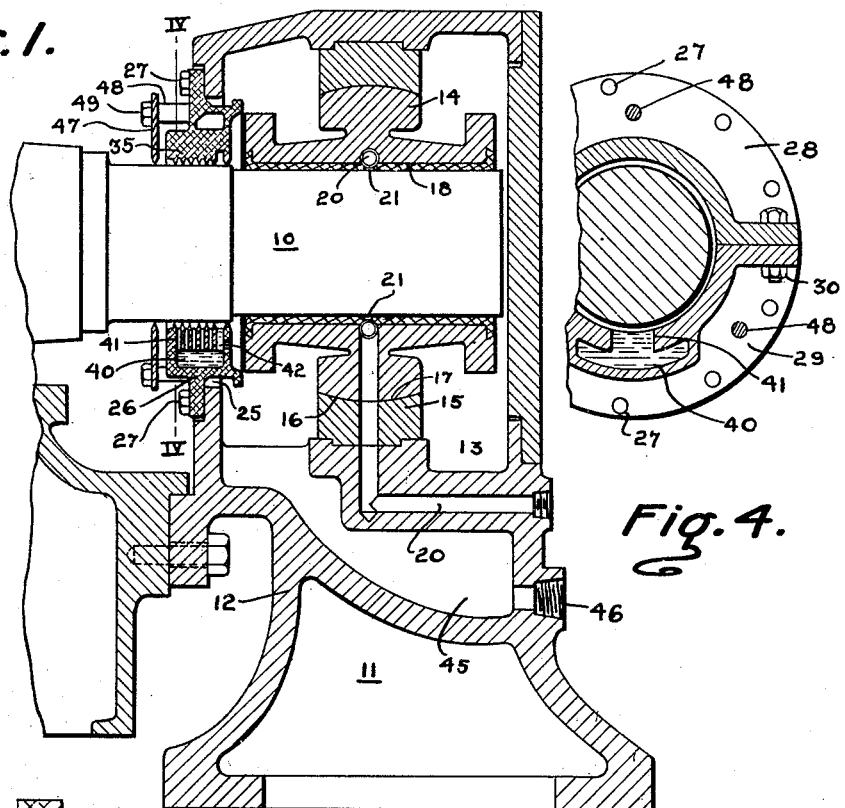
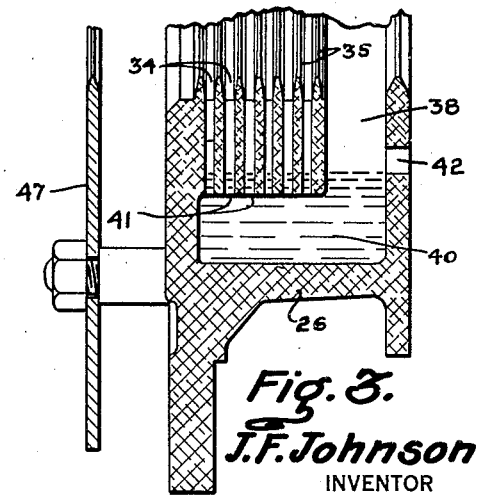
J. F. Johnson
INVENTOR
BY G. C. Davis
ATTORNEY Patented Mar. 4, 1930

1,749,586

UNITED STATES PATENT OFFICE

JOSIAH F. JOHNSON, OF SWARTHMORE, PENNSYLVANIA, ASSIGNOR TO WESTINGHOUSE ELECTRIC & MANUFACTURING COMPANY, A CORPORATION OF PENNSYLVANIA

OIL-SEALING RING FOR TURBINE BEARINGS

Application filed March 28, 1924. Serial No. 702,545.

This invention relates to gland packings for rotatable shafts, particularly to a gland for high speed shafts for sealing against the leakage of vapors from a chamber through a wall of which the shaft passes, and it has for an object to provide a gland of the character described which shall intercept vapors seeping from the chamber along the rotatable shaft, and drain the condensate of the intercepted vapors from the gland. A further object of my invention is to provide a multiple-chambered gland of the above indicated character which shall have means for draining condensed vapors from each chamber into drainage passages in the gland and which shall also have means for maintaining a positive liquid seal between the drainage passages of each of the several chambers.

The gland of the present invention is illustrated in connection with bearings of rotating bodies of considerable weight, but it is to be understood that it is not limited in its application to this specific use. In lubricating bearings of this type, it is desirable to supply lubricant to the bearing under a positive pressure head. Oil is usually supplied to a central portion of a bearing and works outwardly between the bearing shoes and the rotating shaft into the bearing housing, whence it is drained into a suitably disposed receptacle where it is purified, cooled and re-circulated to the bearings. It has been found in practice, however, that some of the lubricant vapors seep outwardly from the bearing housing along the shaft and that the bearing housing closures now employed are incapable of preventing a certain amount of lubricant from escaping.

One of the chief difficulties in eliminating this seepage of lubricant has arisen by reason of the fact that the oil escaping from the bearing housing is in part in a vaporous state. In the structure of the present invention, I am enabled to overcome the deficiency of prior art constructions by sealing against both vapor and liquid seepage of the lubricant. This result is accomplished by the provision of an end closure, or guard ring, for the bearing housing which is provided at its inner periphery with a plurality of annular, serrately-cut grooves, forming annular oil intercepting chambers, and so proportioned that the inner peripheries of the groove walls allow only a very small clearance for the rotating shaft, or may even engage the shaft with a light touching contact. Each oil collection chamber is provided at its lower portion with a drain duct leading to a common pocket, the level of the oil in the pocket being maintained at such a head as to seal the lower ends of each of the drain ducts, and thus to prevent oil vapor from the bearing from entering the annular oil intercepting chambers of the guard ring through the drain ducts. The oil vapors passing outwardly from the bearing housing along the shaft are trapped in the inner annular chamber of the guard ring where they are condensed to some extent and are drained off. Some oil vapors escape from the inner intercepting chamber to the next chamber, and in successively lesser amounts to the succeeding chambers, in which the oil vapor pressure becomes progressively lower by reason of condensation and of the repeated throttling of the escaping vapors in passing from one chamber to the next, and by reason of the sealing of the drains of the several chambers, one from the other. The number of vapor intercepting chambers in the guard ring is dependent upon the conditions of vapor seepage to be met, and in any case should be such that practically no vapor passes by the outermost chamber.

These and other objects, which are manifest in the further description of my invention, may be attained by the employment of the apparatus illustrated in the accompanying drawing in which Fig. 1 is a view in longitudinal section through a shaft bearing embodying my invention; Fig. 2 is a fragmentary sectional view on an enlarged scale of the upper portion of the bearing closure; Fig. 3 is a similar fragmentary view of the lower portion of the closure; and Fig. 4 is a fragmentary section view on the line IV—IV of Fig. 1.

Referring to the drawing, I show at 10, a shaft having one end supported by a bearing structure 11. The bearing structure may be of any suitable design and as shown embodies a pedestal housing 12 having a chamber 13 in which the bearing proper 14 is housed. In the structure illustrated, a supporting ring 15 is secured to the housing 12 and is provided with an inner concave peripheral surface 16 which cooperates with a convex surface 17 on a projection of the bearing 14. This arrangement allows the bearing some freedom of movement with respect to the housing and prevents binding due to axial misalignment of the shaft 10. The bearing 14 is surfaced at its inner periphery with a shoe 18 of bearing metal in a manner common in this art.

Provision is made in the housing 12 for supplying oil, preferably under pressure, to the bearing surfaces and, as shown, comprises a duct 20 which leads upwardly through the housing 12 and bearing support 15 to the bearing 14, where it encircles the bearing surface substantially mid-way thereof and is provided with channels 21 to secure an even distribution of the oil to the bearing.

The housing 12 receives the shaft 10 through a circular opening 25 of considerably larger diameter than the shaft. The space between the housing and the shaft is closed by an annular cover or guard ring 26 suitably secured to the housing, as by bolts 27. For convenience of assembly the guard ring 26 may be made in two sections, preferably an upper section 28 and a lower section 29, secured together by bolts 30 (Fig. 4). The guard ring 26 is serrately cut or striated on its inner periphery to form a series of parallelly-disposed annular channels or oil collecting chambers 34, contiguous one to the other to leave thin disc-like dividing walls or ridges 35 between the channels. The ridges are further reduced in thickness at their edges so that no injury would result to the shaft or to the guard ring should the ridges come in contact with the rotating shaft. The inner channel or oil collecting chamber 38, as illustrated, is deeper and wider than the other oil collecting chambers since the major portion of the oil leaking from the bearing housing is caught in this chamber, and returned to the bearing housing in a manner presently to be described.

In the lower portion of the guard ring 26 is a pocket 40, into which oil from the several chambers 34 is permitted to drain through ducts 41. The chamber 38 is in open communication with the pocket 40 and is provided with a port 42 leading into the interior of the bearing. The port 42 is placed at such a height that the pocket 40 and chamber 38 are filled at all times to a level sufficient to seal the lower ends of the ducts 41 and hence prevent vapors from rising upwardly therethrough into the chambers 34. The oil passing through the port 42 enters an oil pocket 45 whence it is led through an outlet port 46 to a suitable reservoir for reclamation and re-use.

If desired, an outer ring 47 may be carried by the guard ring 26 as by means of studs 48 and bolts 49. Where the guard ring 26 is contiguous to a rotating machine, the ring 47 protects the outer chamber 34 of the guard ring 26 from the suction effects occasioned by the centrifugal pumping action of the rotating machine by means of the interposition of a body of air between the machine and the guard ring.

Having thus described an embodiment of my invention, the operation thereof is as follows: Oil is supplied under pressure to the bearing 14 through the duct 20 and is distributed through channels 21 to a central peripheral zone of the bearing. As the shaft rotates in the bearing 14, the oil works toward each end of the bearing and overflows therefrom into the chamber 13 and pocket 45 of the housing 12. The oil discharged from the bearings is in a more or less heated condition and a portion of the oil both in a liquid and vaporous state seeps along the shaft 10 toward the inner stria or ridge 35 of the guard ring 26. The inner ridge 35 being closely spaced to the shaft 10, some of the oil, as well as the solid particles therein, if any, are turned aside and deposited in the pocket 45. Still some oil seeps outwardly from the housing along the shaft 10 into the chamber 38, where the vapors are to some extent condensed and the liquid oil collected. The ridges or striæ 35 of the ring 26, which is preferably made of aluminum or bearing metal normally are in very close clearance with the shaft 10 and thus form in the ring 26 a number of separated chambers 34 disposed along the shaft. Any vapors leaking from one chamber 34 to a contiguous outer chamber 34 undergo a reduction in pressure and are to some extent condensed therein, so that no objectionable amount of vapor escapes from the outermost of the ridges 35. The condensed vapor collected in the chambers 34 drains through the ducts 41 into the pocket 40, whence it passes through opening 42 into the pocket 45 within the housing 12. The level of the oil in pocket 40, being always above the lower ends of ducts 41, effects a hydraulic seal between the several chambers and at the same time permits a free drainage of the chambers 34.

While I have shown my invention in but one form, it will be obvious to those skilled in the art that it is not so limited, but is susceptible of various other changes and modifications, without departing from the spirit thereof; and I desire, therefore, that only such limitations shall be placed thereupon as are imposed by the prior art or as are specifically set forth in the appended claims.

What I claim is:—

1. In a gland for a high speed shaft and a compartment normally containing condensable vapors and having a wall through which the shaft passes, means associated with the wall and the shaft for intercepting condensable vapors seeping outwardly from the compartment along the shaft, comprising a sealing ring formed with a plurality of chambers having spaced walls disposed in close clearance to the shaft, the sealing ring being formed with a pocket therein below the chambers and with ducts leading from each of the chambers to the pocket, and means for maintaining a body of condensed vapors in the pocket sufficient to seal the ducts against the passage of vapors therethrough.

2. In a bearing for a rotatable shaft and a bearing housing through which the shaft extends, a guard ring closing the opening through which the shaft enters the housing, said guard ring being grooved on its inner periphery to form a series of small annular chambers separated by ridges disposed in close clearance to the shaft, an oil pocket formed in the lower portion of said guard ring, means for draining oil collecting in the grooves into the oil pocket, and means for maintaining a liquid seal between the chambers.

3. A sealing ring for rotatable shafts adapted to be secured to a bearing housing and having its inner periphery grooved to form a plurality of small chambers separated by ridges adapted to approach the shaft with a close clearance, means for draining said chambers, and means for maintaining a liquid seal between the chambers.

4. A sealing ring adapted to embrace a rotatable shaft, formed in sections and having inwardly projecting ridges adapted to closely approach the shaft throughout its periphery to form spaced chambers, said sealing ring having a pocket in the lower part thereof and a duct leading from each of said chambers to the pocket, and means associated with the pocket for maintaining a fixed level of liquid in said ducts.

5. A sealing ring adapted to embrace a rotatable shaft having inwardly projecting ridges adapted to lie in such proximity to the periphery of the shaft as to intercept vapors and to form spaced chambers, said chambers being normally void except for vapors and condensate which may enter thereinto, separate means for withdrawing oil from each of said chambers, and means associated with the withdrawing means to constitute a liquid seal therefor.

6. In a gland for a rotatable shaft and a bearing housing through a wall of which the shaft extends, a guard ring closing the opening through which the shaft enters the housing, said guard ring being grooved on its inner periphery to form a series of small annular chambers separated by ridges disposed in close clearance to the shaft, said chambers being void except for vapors and condensate which may enter thereinto, said guard ring being formed with a pocket therein below the chambers and with ducts leading from each of the chambers to the pocket, means for maintaining a body of condensate in the pocket at a level between the upper and lower ends of said ducts and for draining the overflow into the interior of said housing.

In testimony whereof, I have hereunto subscribed my name this 21st day of March, 1924.

JOSIAH F. JOHNSON.